United States Patent [19]

Kageyama et al.

[11] 3,880,741

[45] Apr. 29, 1975

[54] METHOD OF PRODUCING L-SERINE

[75] Inventors: Katsusuke Kageyama, Yokohama; Isamu Maeyashiki; Koji Kubota, both of Kawasaki; Shinpachi Konishi, Chigasaki; Shinji Okumura, Tokyo, all of Japan

[73] Assignee: Ajinomoto Co., Inc., Tokyo, Japan

[22] Filed: Nov. 19, 1973

[21] Appl. No.: 417,208

[30] Foreign Application Priority Data
Nov. 24, 1972 Japan.............................. 47-117836

[52] U.S. Cl. ................................................ 195/29
[51] Int. Cl........................................... C12d 13/06
[58] Field of Search ...................................... 195/29

[56] References Cited
UNITED STATES PATENTS
3,623,952   11/1971   Kubota et al. ........................ 195/29

*Primary Examiner*—Lionel M. Shapiro
*Assistant Examiner*—Robert J. Warden
*Attorney, Agent, or Firm*—Hans Berman

[57] ABSTRACT

Artificially induced mutants of the serine producing strain Corynebacterium glycinophilum ATCC 21341 which require leucine, isoleucine, methionine, tryptophan, serine, or glycine for their growth produce L-serine from glycine in higher yields than the parent strain which does not require such nutrients.

5 Claims, No Drawings

METHOD OF PRODUCING L-SERINE

This invention relates to the production of L-serine by fermentation of glycine.

It is known from the commonly owned U.S. Pat. No. 3,623,952 that L-serine may be produced by fermentation of glycine by certain microorganisms which include Corynebacterium sp. ATCC 21341. It has now been discovered that artificially induced mutants of this species of Corynebacterium produce serine in significantly greater yields than could be obtained by the method of the earlier patent. The mutants are characterized by specific nutrient requirements, but may differ from each other in the required nutrient which may be leucine, isoleucine, methionine, tryptophan, serine, or glycine, or more than one of these amino acids.

The parent strain, referred to in the earlier patent as Corynebacterium sp., has now been investigated in more detail and has the following taxonomic characteristics:

1. Vegetative Cells:
   Short rods usually single or two, varying in form, size 0.6 – 0.8 × 1.0 – 3.0 microns on nutrient agar at 30°C for 24 hours, non-motile, spore not formed, gram-positive, not acid-fast.
2. Agar Colonies:
   Circular, smooth, entire, raised to convex, opaque, grayish white, medium unchanged.
3. Gelatin colonies:
   Circular, raised to convex, entire, no liquefaction, smooth, opaque.
4. Agar stroke:
   Moderate growth, filiform, glistening, grayish-white butyrous, medium unchanged.
5. Nutrient broth:
   No growth on the surface-turbid, sediment flocculent, amount of sediment scanty.
6. Temperature relation:
   Growth at 20°C to 37°C, no growth at 42°C.
7. Physiological characteristics:
   1. BCP milk: unchanged to slightly alkaline
   2. MR Test: negative
   3. Voges Proscauer reaction: negative
   4. Indole production: negative
   5. Reduction of nitrate: positive
   6. Liquefaction of gelatin: negative
   7. Hydrolysis of starch: negative
   8. Utilization of citrate: utilize
   9. No acid and gas from arabinose, xylose, glucose, mannose, fructose, galactose, lactose, maltose, saccharose, trehalose, raffinose, sorbitol, inositol, glycerol, salicin, α-methylglycoside, inulin, dextrin, starch and cellulose (peptone medium)
   10. Slightly acid but no gas from glucose aerobically, but no acid and gas anaerobically by the method of Hugh and Leifson
   11. Catalase: positive
   12. Aerobic
   13. Growth on nutrient broth supplemented with 6% glycine.
8. Source:
   Putrefied fruit.

This microorganism could not be identified with any microorganism described in Bergey's Manual of Determinative Bacteriology, 7th ed., is therefore considered a new species, and has been named *Corynebacterium glycinophilum*.

The mutants are derived from *C.glycinophilum* by means of any conventional mutagenic agent, as by treating cells of the parent strain with 0.1 M diethyl sulfate solution at 30°C for 20 hours, screening the treated cells by the replication method, and examining them for their ability of producing L-serine.

The five best strains of *C.glycinophilum* obtained so far have been deposited with the Fermentation Research Institute, Agency of Industrial Science and Technology, the Ministry of Industrial Trade and Industry, in Chiba-shi, Chiba-ken, Japan, and are freely available from the Institute. Their accession numbers and the specific nutrients required by them are listed below:

FERM-P 1685 (leucine)
FERM-P 1686 (tryptophan)
FERM-P 1687 (leucine + methionine)
FERM-P 1688 (leucine + isoleucine)
FERM-P 1689 (leucine + serine or glycine)

The culture media on which the mutant strains of this invention are cultured may be entirely conventional aside from the required specific nutrients. Thus, carbohydrates (glucose, sucrose, maltose, fructose, starch hydrolyzate, molasses), organic acids (acetic, propionic, citric, benzoic acid), or alcohols (ethanol) may provide carbon, and ammonia, ammonium salts (sulfate, chloride) and organic nitrogen bearing compounds (amino acids, urea) are suitable sources of assimilable nitrogen. The usual inorganic ions (phosphate, calcium, magnesium, iron, manganese) are to be supplied, and the yield and rate of production of L-serine from glycine in the culture medium are improved by known growth promoting agents, such as vitamins, soybean protein hydrolyzate, yeast extract, corn steep liquor, peptone, and casein hydrolyzate. The growth promoting agents may contain enough of the specifically required nutrients.

The glycine concentration in the medium is preferably 0.5 to 4 g/dl, and glycine may be added to the medium before inoculation, early during culturing, or gradually.

Microbial fermentation of glycine is preferably carried out under aerobic conditions maintained by shaking, stirring, or by aeration. The pH should be held between 5.0 and 9.0 by adding acids, alkali hydroxide or carbonates of alkali or alkaline earth metals in a known manner. The preferred cultivation temperature is 24° to 37°C. Maximum serine concentration is reached within two to five days depending on process variables.

The cells may also be harvested from the broth and dispersed as an enzyme source in an aqueous glycine solution at pH 5.0 – 9.0 for 5 to 48 hours at 25°C to 40°C to produce L-serine by enzyme action from the glycine and a source of carbon assimilable by the microorganisms.

L-Serine is practically the only amino acid produced by the cultures or during enzymatic reaction so that L-serine may be recovered from a cell-free filtrate by means of a cation exchange resin of the H type, eluted, and crystallized from the eluate after partial evaporation of the water present.

The concentrations of L-serine reported in the following Examples, which further illustrate the method of the invention, were determined by microbioassay employing *Leuconostoc mesenteroides*, and the purity of the L-serine produced was checked by paper chromatography.

EXAMPLE 1

The five mutant strains identified above and the parent strain C.glycinophilum ATCC 21341 were cultured on respective 20 ml batches of a stock medium supplemented with the nutrients listed in Table 1. The stock medium contained 5 g/dl glucose, 0.2 g/l ammonium sulfate, 0.3 g/dl ammonium nitrate, 0.1 g/dl $KH_2PO_4$, 0.05 g/dl $MgSO_4.7H_2O$, 0.2 mg/l biotin, 1 mg/l thiamine HCl, 1 mg/l nicotinamide, 1 mg/l pyridoxal HCl, 1 mg/l folic acid, 2 mg/l riboflavin, 1 mg/l calcium pantothenate, 0.2 mg/l pyridoxin, 1 mg/l p-aminobenzoic acid, 0.05 g/dl DL-methionine, 0.05 g/dl L-glutamic acid, 0.05 g/dl L-valine, 2 g/dl glycine, and was adjusted to pH 6.5.

Each medium was sterilized in a 500 ml shaking flask with steam at 110°C for 5 minutes, and then inoculated with the microorganisms which had been cultured on bouillon agar slants at 30°C for 20 hours. The concentration of L-serine accumulated in each culture medium after 72 hours of shaking at 31°C is listed in Table 1.

TABLE 1

| C.glycinophilum | | Nutrient | Serine, g/l |
|---|---|---|---|
| FERM-P | 1685 | L-leucine,0.03 g/dl | 10.6 |
| | 1686 | L-Tryptophan,0.02 g/dl | 9.7 |
| | 1687 | L-leucine,0.03 g/dl | 11.5 |
| | 1688 | L-leucine,0.03 g/dl,+ L-isoleucine,0.03 g/dl | 10.2 |
| | 1689 | L-leucine,0.03 g/dl | 8.9 |
| ATCC | 21341 | None | 7.8 |

EXAMPLE 2

C.glycinophilum FERM-P 1687 was cultured in the manner described in Example 1 to a L-serine concentration of 11.5 g/l, and one liter of the cultured broth was filtered to remove the cells. The filtrate was adjusted to pH 1.0 – 2.0 and passed over a cation exchange resin (Dowex 50-X4). The resin was washed with one liter water, and thereafter with 0.025 N hydrochloric acid, and the L-serine was eluted with 0.2 N hydrochloric acid. The eluate was partly evaporated in a vacuum, and cold alcohol was added to the concentrate to precipitate L-serine in crystalline form. The recrystallized, pure L-serine weighed 5.8 g.

EXAMPLE 3

300 ml Batches of an aqueous culture medium containing 10 g/dl glucose, 0.2 g/dl ammonium sulfate, 0.3 g/dl ammonium nitrate, 0.05 g/dl $MgSO_4.7H_2O$, 0.1 g/dl $KH_2PO_4$, 0.2 mg/l biotin, 1 mg/l thiamine HCl, 2.5 mg/l nicotinamide, 1 mg/l folic acid, 0.3 g/dl DL-methionine, 0.06 g/dl L-leucine, 1 g/dl soybean protein hydrolyzate (2.4% total nitrogen), and 3 g/dl separately sterilized glycine, and adjusted to pH 7.0, were placed in one-liter jar fermentors and inoculated with C.glycinophilum FERM-P 1687 that had been cultured 40 hours at 30°C on bouillon agar slants.

The cultures were aerated at 34°C with air at a rate of 1/2 volume per minute, and aqueous ammonia was added as needed to hole the pH at 6.5. After 56 hours, the L-serine concentration in the broth was 15.9 g/l, and 4.4 g crystalline L-serine was recovered by the procedure of Example 2 from 500 ml of the broth.

EXAMPLE 4

The six strains listed in Table 1 were cultured as described in Example 1, and the microbial cells were harvested by centrifuging. They were then washed with a reaction solution containing 2 g/dl glucose or acetic acid, 2 g/dl glycine, 0.1 g/dl $KH_2PO_4$, 0.04 g/dl $MgSO_4.7H_2O$, 2.5 mg/l nicotinamide, and 1 mg/l thiamine HCl, and adjusted to pH 7.5.

Approximately equal amounts of microbial cells were dispersed in 20 ml reaction solution in which the glucose or acetic acid provided a carbon source.

The concentration of the cells in each reaction mixture was measured by diluting an aliquot with 25 volumes of water and measuring the optical density of the diluted mixture at 562 m$\mu$. The bulk of each mixture was held at 37°C for 24 hous with shaking, whereupon the accumulated amount of L-serine was determined.

Table 2 lists the initial optical density ($OD_{562}$) and final L-serine concentration for each mixture.

TABLE 2

| C.glycinophilum | $OD_{562}$ | L-serine, g/l from | |
|---|---|---|---|
| | | Glucose | Ac. Acid |
| FERM-P 1685 | 0.64 | 3.0 | 1.6 |
| 1686 | 0.68 | 3.6 | 1.3 |
| 1687 | 0.67 | 4.3 | 2.1 |
| 1688 | 0.65 | 3.3 | 1.5 |
| 1689 | 0.67 | 2.9 | 1.4 |
| ATCC 21341 | 0.66 | 2.5 | 1.0 |

What is claimed is:
1. A method of producing L-serine which comprises:
   a. holding cells of an artificially induced mutant of Corynebacterium glycinophilum in contact with an aqueous solution of glycine and a carbon source under aerobic conditions until L-serine accumulates in said solution,
      1. said mutant requiring, for the growth thereof, at least one nutrient of the group consisting of leucine, isoleucine, methionine, tryptophan, serine, and glycine,
      2. the pH value of said solution being between 5 and 9, and
      3. the concentration of said glycine in said solution being between 0.5 and 5 g/dl; and
   b. recovering the accumulated L-serine from said aqueous solution.
2. A method as set forth in claim 1, wherein said solution further contains sources of assimilable carbon and nitrogen, inorganic salts, and minor organic nutrients necessary for the growth of said mutant, and is held at a temperature of 24° to 37°C until said L-serine accumulates, the concentration of said glycine being not greater than 4 g/dl.
3. A method as set forth in claim 2, wherein said mutant is Corynebacterium glycinophilum FERM-P 1685, FERM-P 1686, FERM-P 1687, FERM-P 1688, or FERM-P 1689.
4. A method as set forth in claim 1, said cells being cultured prior to said holding-in-contact in a medium containing sources of assimilable carbon and nitrogen, inorganic salts, and minor organic nutrients necessary for the growth of said mutant, at said pH and at a temperature of 24° to 37°C.
5. A method as set forth in claim 4, wherein said mutant is Corynebacterium glycinophilum FERM-P 1685, FERM-P 1686, FERM-P 1687, FERM-P 1688, or FERM-P 1689.

* * * * *